(12) United States Patent  (10) Patent No.: US 7,869,445 B2
Kawahigashi  (45) Date of Patent: Jan. 11, 2011

(54) METHOD OF DATA TRANSMISSION IN COMMUNICATION SYSTEM

(75) Inventor: Haruko Kawahigashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 239 days.

(21) Appl. No.: 12/031,269

(22) Filed: Feb. 14, 2008

(65) Prior Publication Data

US 2009/0059932 A1   Mar. 5, 2009

(30) Foreign Application Priority Data

Aug. 27, 2007   (JP) ............................. 2007-220046

(51) Int. Cl.
*H04L 12/28* (2006.01)
(52) U.S. Cl. ...................... 370/400; 713/181
(58) Field of Classification Search ................ 370/389, 370/400, 328; 713/181
See application file for complete search history.

(56) References Cited

U.S. PATENT DOCUMENTS

2006/0282677 A1* 12/2006 Rodriguez et al. .......... 713/181
2007/0127367 A1* 6/2007 Ogasahara et al. .......... 370/226
2007/0189191 A1* 8/2007 Ades ........................... 370/254

OTHER PUBLICATIONS

Rudolf Ahiswede, et al., "Network Information Flow", IEEE Transactions on Information Theory, vol. 46, No. 4, Jul. 2000, pp. 1204-1216.

(Continued)

*Primary Examiner*—Robert W Wilson
*Assistant Examiner*—Wei Zhao
(74) *Attorney, Agent, or Firm*—Oblon, Spivak, McClelland, Maier & Neustadt, L.L.P.

(57) ABSTRACT

A communication system includes a source node for transmitting data and general nodes that function as relay nodes for relaying the data or destination nodes for receiving the data. Data encoding is performed in each node of the communication system. The source node is linked to the general nodes by one or more independent paths. The number of independent paths from the source node to each of the general nodes is counted. A tap-proof index is calculated based on the maximum number of independent paths and the size of a set of elements formed by the encoded data. The security level against tapping is determined according to the value of the tap-proof index.

6 Claims, 8 Drawing Sheets

OTHER PUBLICATIONS

Shuo-Yen Robert Li, et al., "Linear Network Coding", IEEE Transactions on Information Theory, vol. 49, No. 2, Feb. 2003, pp. 371-381.

Yamamoto Miki, "Network Coding", Journal of Institute of Electronics, Information and Communication Engineers (IEICE), vol. 90, No. 2, Feb. 2007, pp. 111-116 (with partial English translation).

Jianlong Tan, et al., "Secure Network Coding with a Cost Criterion", Modeling and Optimization in Mobile, Ad Hoc and Wireless Networks, 2006 4$^{th}$ Internatioanl Symposium on Boston, IEEE XP010933027, Apr. 3, 2006, pp. 1-6.

Luisa Lima, et al., "Random Linear Network Coding: A Free Cipher?", Information Theory, 2007. ISIT 2007. IEEE International Symposium on, XP031282139, Jun. 24, 2007, pp. 546-550.

Ning Cai, et al., "A Security Condition for Multi-Source Linear Network Coding", Information Theory, 2007. ISIT 2007. IEEE Internatioanl Symposium on, XP031282141, Jun. 24, 2007, pp. 561-565.

Ralf Koetter, et al.,"An Algebraic Approach to Network Coding", IEEE/ACM Transactions on Networking, vol. 11, No. 5, XP007908088, Oct. 1, 2003, pp. 782-795.

Haruko Kawahigashi, et al.,"Security Aspects of the Linear Network Coding", Military Communications Conference, MILCOM, IEEE, XP031232511, Oct. 29, 2007, pp. 1-7.

Lauer, Gregory et al.; "Network Coding Performance: An Emulation Experiment"; 978-1-4244-2677-May 8, 2008 IEEE, 7 pages.

* cited by examiner

METHOD OF DATA TRANSMISSION IN COMMUNICATION SYSTEM

BACKGROUND OF THE INVENTION

1. Field of the Invention

The present invention relates to a method of data transmission in a communication system.

2. Description of the Related Art

A conventional network that performs packet communication includes communication devices called nodes that are interconnected by links. Information is transmitted in the network from a source node to a destination node through communication paths that include relay nodes. A relay node only sorts the packets based on the data in the packets and redirects them towards the corresponding destination nodes. In other words, a relay node does not perform any process on user data in a packet.

In addition to sorting the packets, data encoding can be performed at each relay node by using a network coding technology to efficiently transmit the data over the network. For a more complete description of the network coding technology, reference may be had to, e.g., nonpatent literature as follows:

R. Ahlswede et al., "Network information flow", IEEE trans. on Information Theory, Vol. 46, No. 4, July 2000, pp. 1204-1216;

Yamamoto Miki, "Network coding", Journal of Institute of Electronics, Information and Communication Engineers (IEICE), Vol. 90, No. 2, February 2007, pp. 111-116; and S-Y. R. Li et al., "Linear network coding", Vol. 49, No. 2, February 2003, pp. 371-381.

Main advantage of the network coding, apart from allowing efficient use of communication resources such as a bandwidth, is that it provides better data confidentiality. Concretely, in the network coding technology, encoding process is performed on the data in each packet at each relay node, so that even if an outsider succeeds in tapping the data during transmission, it is difficult to break the data code thereby maintaining the data security.

However, quantitative evaluation of the security level is not performed in the abovementioned network coding technology. Thus, it is difficult to determine the security level of data encoding thereby failing to ensure that the data security is maintained at all the time.

SUMMARY OF THE INVENTION

It is an object of the present invention to at least partially solve the problems in the conventional technology.

According to an aspect of the present invention, there is provided a method of transmitting data in a communication system, the communication system including a source node that generates the data and a plurality of general nodes, each being a destination node for the data or a relay node for relaying the data, the source node being linked with each of the general nodes by at least one independent path, the data being encoded by using an encoding matrix at the source node and the relay node. The method including determining a general node from among the general nodes that has maximum number of independent paths up to the source node; setting a size of a set formed by elements of the encoding matrix; calculating a tap-proof index (also known as wire-tap robustness index, i.e., WTR index) that indicates security level against tapping of the data flowing in the communication system based on the maximum number of independent paths and the size of the set; and controlling the tap-proof index.

According to another aspect of the present invention, there is provided a method of transmitting data in a communication system, the communication system including a source node that generates the data and a plurality of general nodes, each being a destination node for the data or a relay node for relaying the data, the source node being linked with each of the general nodes by at least one independent path, the independent path including at least one communication link, the data being encoded at the source node and the relay node. The method including determining a general node from among the general nodes that has maximum number of independent paths up to the source node; calculating an encoding vector corresponding to each of the communication links; encoding data passing through a communication link by multiplying an encoding vector corresponding to the communication link to the data passing through the communication; obtaining a subspace of each of the encoding vectors; selecting encoding vectors of less than or equal to a second maximum number of independent paths from among the encoding vectors, the second maximum number of independent paths being one less than the maximum number of independent paths; first-calculating, when number of the encoding vectors selected at the selecting is less than the second maximum number of independent paths, a vector subspace that is formed by the encoding vectors selected at the selecting and a vector, the vector belonging to a group of vectors that have number of dimensions equal to the maximum number of independent paths with only one of components being 1 and all other components being 0; second-calculating, when the number of the encoding vectors selected at the selecting is equal to the second maximum number of independent paths, a vector subspace formed by only the encoding vectors selected at the selecting; deselecting the vector subspace calculated at any one of the first-calculating and the second-calculating when the vector subspace includes the subspace obtained at the obtaining; repeating the selecting, the first-calculating, the second-calculating, and the deselecting if there is a vector in the group yet to be processed at the first-calculating and an encoding vector yet to be selected at the selecting; and assigning an encoding vector, the vector subspace of which is not deselected at the deselecting, to the communication link.

According to still another aspect of the present invention, there is provided a communication system including a source node that generates the data and a plurality of general nodes, each being a destination node for the data or a relay node for relaying the data, the source node being linked with each of the general nodes by at least one independent path, the data being encoded by using an encoding matrix at the source node and the relay node. Any one node from among the source node and the general nodes includes a determining unit that determines a general node from among the general nodes that has maximum number of independent paths up to the source node; a setting unit that sets a size of a set formed by elements of the encoding matrix; a calculating unit that calculates a tap-proof index that indicates security level against tapping of the data flowing in the communication system based on the maximum number of independent paths and the size of the set; and a controlling unit that controls the tap-proof index.

According to still another aspect of the present invention, there is provided a communication system including a source node that generates the data and a plurality of general nodes, each being a destination node for the data or a relay node for relaying the data, the source node being linked with each of the general nodes by at least one independent path, the independent path including at least one communication link, the data being encoded at the source node and the relay node. Any one node from among the source node and the general nodes including a determining unit that determines a general node from among the general nodes that has maximum number of independent paths up to the source node; an encoding-vector calculating unit that calculates an encoding vector corresponding to each of the communication links; an encoding unit that encodes data passing through a communication link by multiplying an encoding vector corresponding to the communication link to the data passing through the communication; a subspace calculating unit that calculates a subspace of each of the encoding vectors; a selecting unit that selects encoding vectors of less than or equal to a second maximum number of independent paths from among the encoding vectors, the second maximum number of independent paths being one less than the maximum number of independent paths; a first selected-subspace calculating unit that calculates, when number of the encoding vectors selected by the selecting unit is less than the second maximum number of independent paths, a vector subspace that is formed by the encoding vectors selected by the selecting unit and a vector, the vector belonging to a group of vectors that have number of dimensions equal to the maximum number of independent paths with only one of components being 1 and all other components being 0; a second selected-subspace calculating unit that calculates, when the number of the encoding vectors selected by the selecting unit is equal to the second maximum number of independent paths, a vector subspace formed by only the encoding vectors selected by the selecting unit; a deselecting unit that deselects the vector subspace calculated by any one of the first selected-subspace calculating unit and the second selected-subspace calculating unit when the vector subspace includes the subspace calculated by the subspace calculating unit, wherein the selecting unit, the first selected-subspace calculating unit, the second selected-subspace calculating unit, and the deselecting unit repeat their operations if there is a vector in the group yet to be processed by the first selected-subspace calculating unit and an encoding vector yet to be selected by the selecting unit; and an assigning unit that assigns an encoding vector, the vector subspace of which is not deselected by the deselecting unit, to the communication link.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
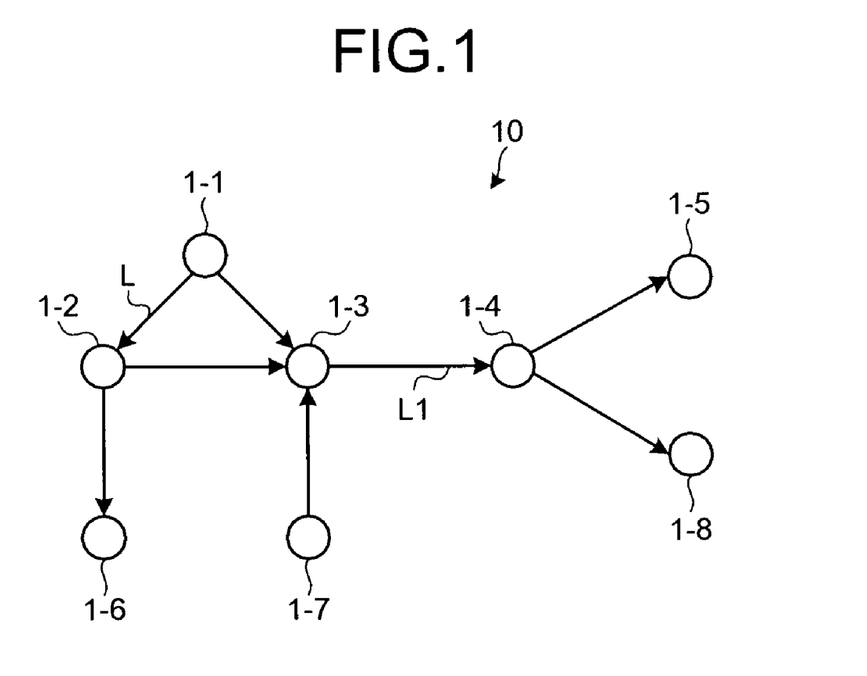
FIG. 1 is an exemplary schematic diagram of a communication system according to a first embodiment of the present invention.

FIG. 1 is an exemplary schematic diagram of a communication system 10 according to a first embodiment of the present invention. The communication system 10 includes a plurality of communication devices called nodes from 1-1 to 1-8. Each of the nodes 1-1 to 1-8 is linked by a link L having a predetermined communication direction shown by arrow marks in FIG. 1. For example, a link L1 links the node 1-3 to the node 1-4 such that the node 1-3 can transmit data to the node 1-4 but not vice versa.

Figure 2:
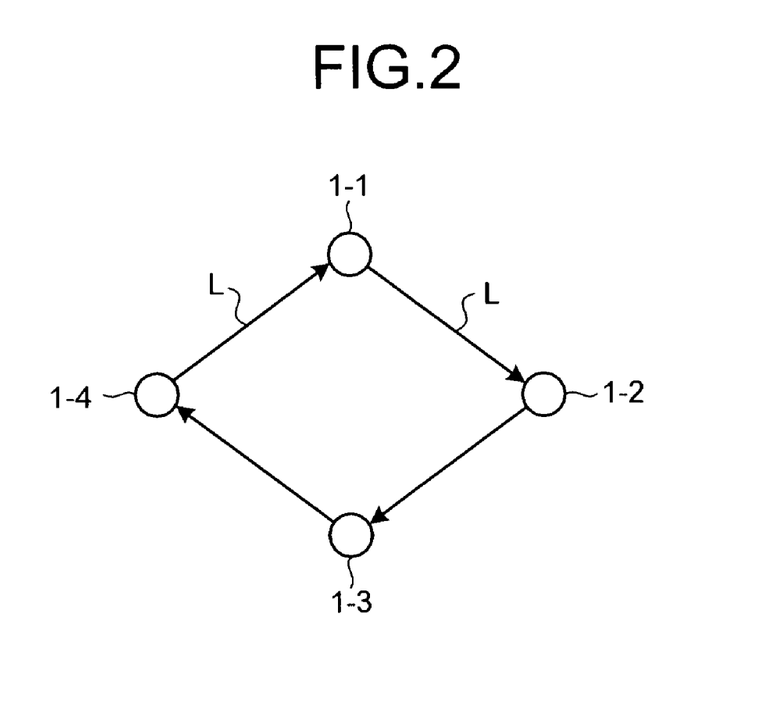
FIG. 2 is an exemplary schematic diagram of a communication system that is out of the scope of the first embodiment.

A communication system shown in FIG. 2 is out of the scope of the first embodiment; because, it includes a recursive communication path. That is, a link L emerging from a node 1-1 eventually returns to the node 1-1.

Figure 3:
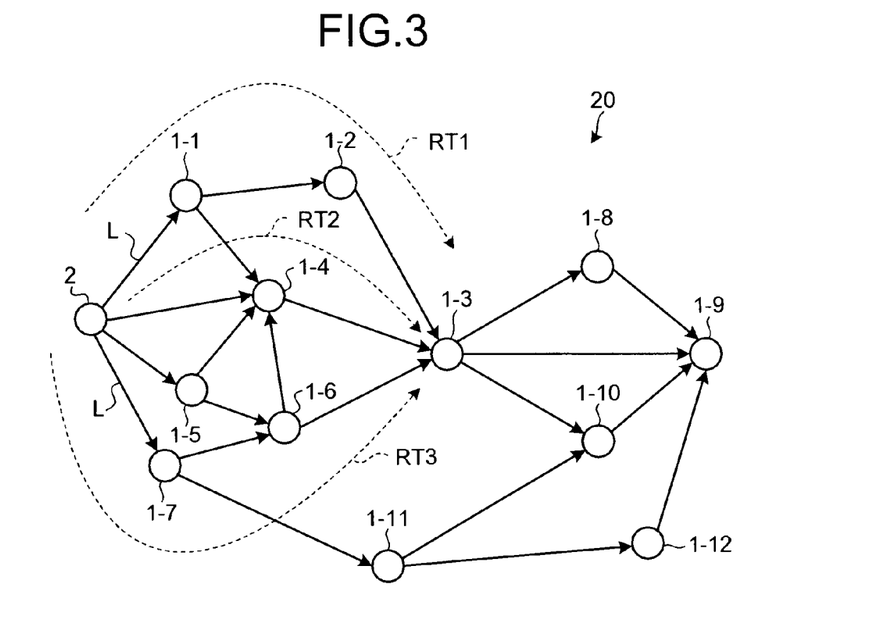
FIG. 3 is another exemplary schematic diagram of a communication system according to the first embodiment.

FIG. 3 is another exemplary schematic diagram of a communication system 20 according to the first embodiment. The first embodiment is described in detail below with reference to FIG. 3. The communication system 20 includes a source node 2 for transmitting information and general nodes from 1-1 to 1-12. A general node functions as a relay node for relaying the information or a destination node for receiving the information. The source node 2 is linked to each of the general nodes 1-1 to 1-12 by one or more independent paths. Each independent path linking a source node to a destination node includes exclusive links L. For example, if the general node 1-3 is the destination node, three independent paths exist between the source node 2 and the destination node: a path RT1 through the relay nodes 1-1 and 1-2, a path RT2 through the relay node 1-4, and a path RT3 through the relay nodes 1-7 and 1-6.

The number of independent paths inbound to each of the general nodes 1-1 to 1-12 is counted, and the general node having the maximum number, d, of inbound independent paths is determined. For example, in the communication system 20, the source node 2 is linked to the general node 1-9 by four independent paths, which is more than in case of any other general nodes 1-1 to 1-8 and 1-10 to 1-12. Therefore, for the communication system 20 the value of d is four (d=4).

Given below is the description of how data is transmitted in the communication system 20. First, scalar quantization is performed to obtain a set of scalars that form components of a vector. An integer 'Z' is divided by a prime number 'p' to obtain a finite set of remainders 'K' on which all four arithmetic operations can be performed. The size of the set K (i.e., the number of remainders in the set K) is considered to be 'k'. Naturally, the value of k is equal to that of p. The set K can be expressed as follows:

$$K=\{x|x=\mod(Z,p)\}=\{0, 1, 2, \ldots, p-1\} \quad (1)$$

To simplify the description, the value of p is set to 2. A d-dimensional vector is generated from the elements of the set K and is considered to be the unit of encoding. In other words, the data is transmitted by digitizing and encoding (encrypting) in the form of d-dimensional vectors having the elements of the set K as their components.

Figure 4:
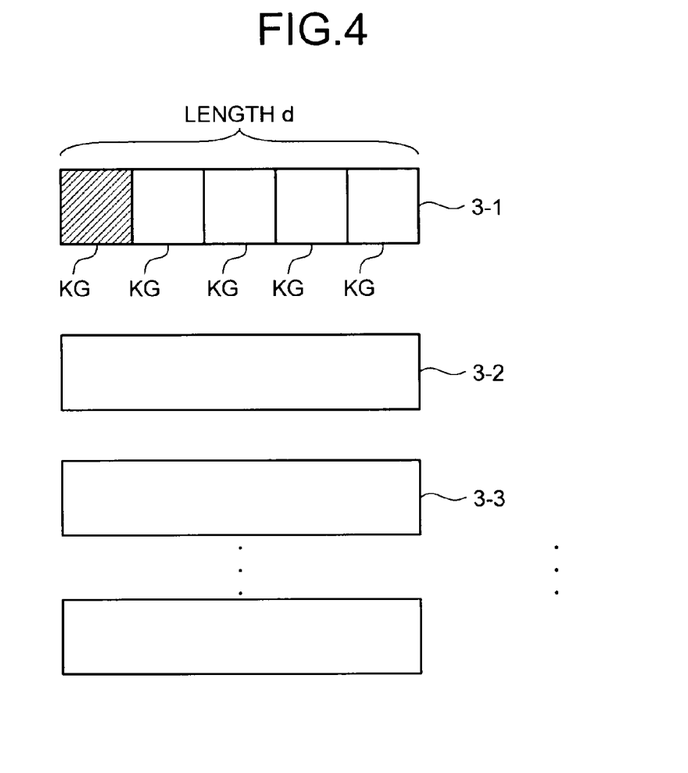
FIG. 4 is a schematic diagram of data transmitted from a source node shown in FIG. 3.

FIG. 4 is a schematic diagram of data transmitted from the source node 2 toward a destination node. The data is digitized into d-dimensional vectors such as vectors 3-1, 3-2, 3-3, .... Elements 'KG' of the set K form components of the vectors 3-1, 3-2, 3-3, .... Hereinafter, a d-dimensional vector such as any one of the vectors 3-1, 3-2, 3-3, . . . is referred to as a d-dimensional vector 3. As described above, because the value of p is set to 2, the elements KG are 0 and 1. The data in the source node 2 is divided in d-dimensional vectors and transmitted in the order of the vector 3-1, the vector 3-2, the vector 3-3, and so on. The data corresponding to each of the vectors 3-1, 3-2, 3-3, . . . , i.e., the components of each of the vectors 3-1, 3-2, 3-3, . . . are transmitted through the corresponding d number of independent paths.

Figure 5:
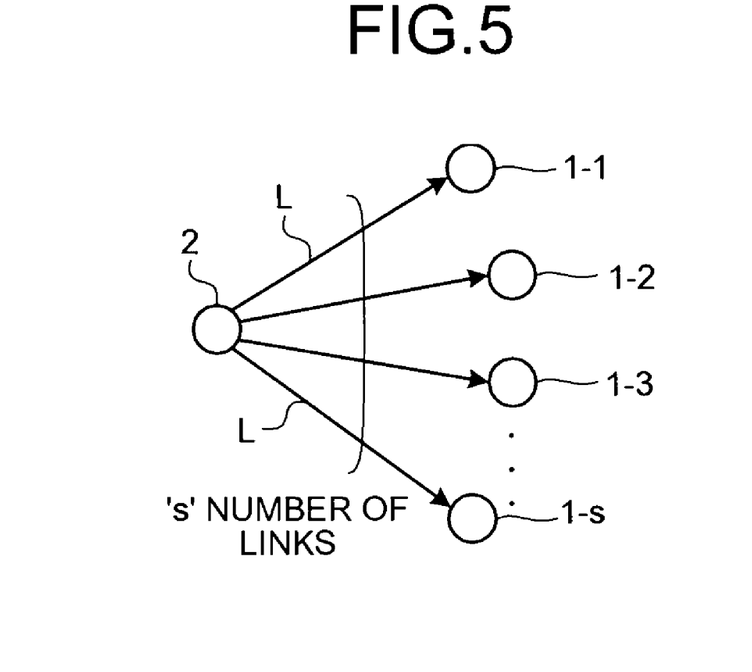
FIG. 5 is an exemplary diagram depicting a plurality of links originating from the source node.

Given below is the description of how the source node 2 encodes data before transmitting the data to another node. FIG. 5 is an exemplary diagram depicting 's' number of the links L originating from the source node 2. First, data in the form of a d-dimensional vector VS1 formed by arbitrary remainders in the set K is multiplied by a matrix MS1 having s number of columns and d number of rows to obtain a data vector VSD1. The data vector VSD1 is transmitted to each of the links L corresponding to the d number of independent paths. That is, the data vector VSD1 is transmitted as the d-dimensional vector 3 in an encoded form. Equation (2) is an example of the data vector VSD1 when p=2, d=3, and s=4.

$$VSD1 = MS1 \cdot VS1 \quad (2)$$

$$= \begin{bmatrix} 1 & 0 & 1 \\ 0 & 1 & 1 \\ 1 & 1 & 1 \\ 0 & 1 & 0 \end{bmatrix} \begin{bmatrix} 1 \\ 0 \\ 1 \end{bmatrix}$$

$$= \begin{bmatrix} 0 \\ 1 \\ 0 \\ 0 \end{bmatrix}$$

The order of the matrix MS1 used in Equation (2) is exemplary and not limited to that is actually shown. The matrix MS1 can be any matrix formed by the elements in the set K and having s number of columns and d number of rows.

Figure 6:
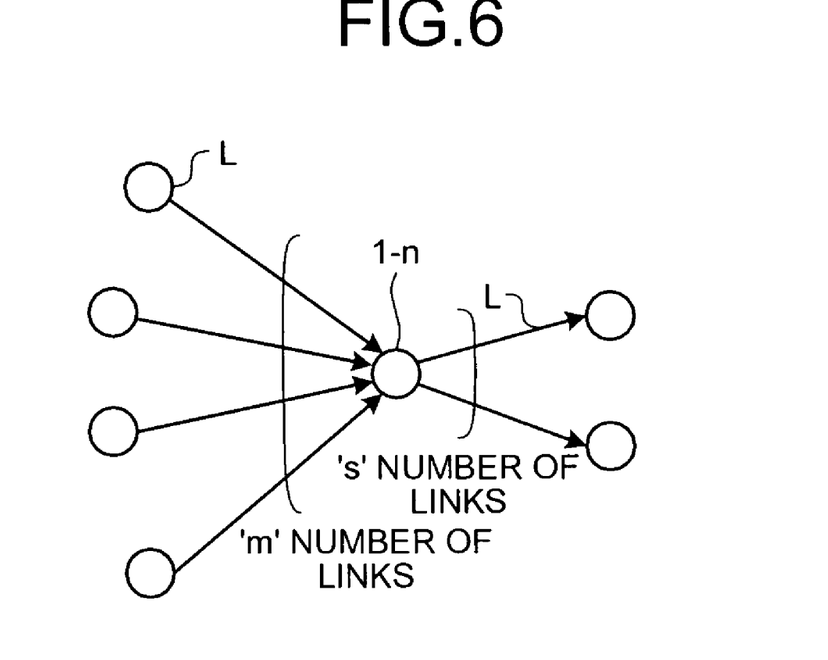
FIG. 6 is an exemplary schematic diagram of links inbound to a general node and links emerging from the general node.

Given below is the description of how a general node 1-*n* (n is a natural number representing node number). FIG. 6 is an exemplary schematic diagram depicting 'm' number of links L inbound to the general node 1-*n* and 's' number of links L emerging from the general node 1-*n*. In this example, the general node 1-*n* receives data transmitted through each of the m number of links L. The data transmitted to the general node 1-*n* from the source node 2 and through the links L is in the form of the elements of the set K. The data transmitted to the general node 1-*n* can be expressed as a one dimensional vector VT2. The one dimensional vector VT2 can be converted to a data vector VD2 by multiplying by a matrix MT having s number of columns and one row. The data vector VD2 is transmitted through the links L emerging from the general node 1-*n* to subsequent nodes. Equation (3) is an example of the data vector VD2 when p=2, l=4, and s=2.

$$VTD2 = MT2 \cdot VT2 \quad (3)$$

$$= \begin{bmatrix} 0 & 1 & 1 & 1 \\ 1 & 0 & 1 & 1 \end{bmatrix} \begin{bmatrix} 1 \\ 0 \\ 0 \\ 1 \end{bmatrix}$$

$$= \begin{bmatrix} 1 \\ 0 \end{bmatrix}$$

The order of the matrix MT used in Equation (3) is exemplary and not limited to that actually shown. The matrix MT can be any matrix formed by the elements in the set K and having s number of columns and d number of rows. As described above, because it is assumed that a recursive communication path is out of the scope of the first embodiment, the data to be transmitted through each of the links L can be determined by repeating the encoding procedures.

Such encoding process is performed in all the general node 1-*n* that exist between the source node 2 and the destination node. As a result, encoded data reaches the destination node. In this process of encoding, it is necessary to protect the encoding parameters, i.e., the matrices MS1 and MT, so that an unauthorized person can not tap them. Even if an unauthorized person is successful in tapping encoded data in any of the links, the original data remains protected until the encoding parameters remain undetected. Thus, from the security point of view, it is necessary to prevent the encoding parameters from getting detected or at least prolong the amount of time at which the data code may be broken.

To achieve that object, first, the security (safety) level against tapping is determined by defining a tap-proof index that represents the average number of times for which a tapping procedure needs to be repeated to tap the entire encoding method, i.e., the matrices MS1 and MT. Such a tap-proof index F(k,d) can be expressed by Equation (4):

$$F(k, d) = \sum_{j=1}^{d} \frac{k^j}{k^j - 1} \quad (4)$$

Figure 7:
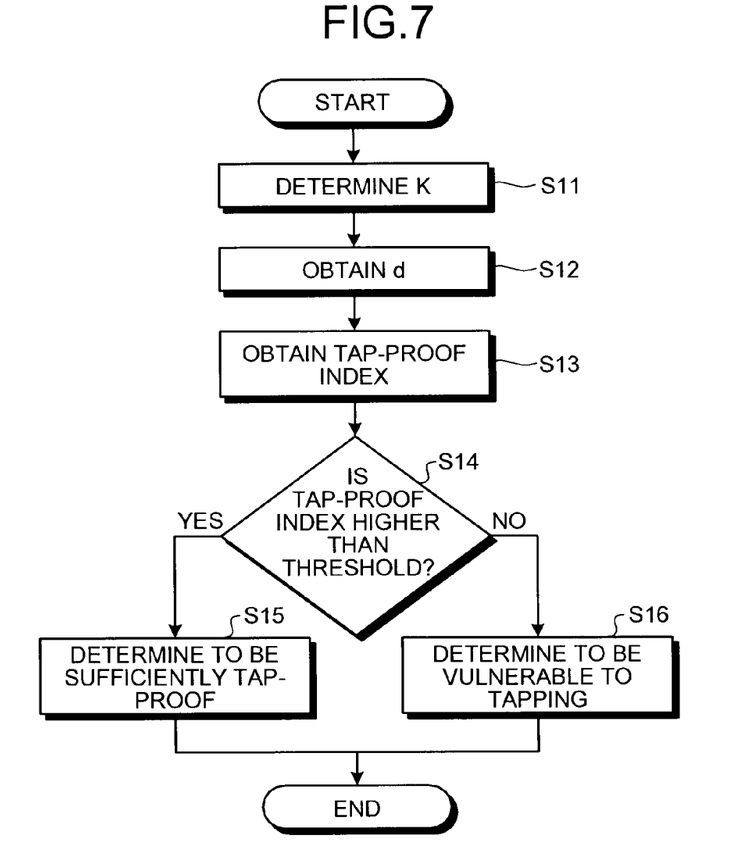
FIG. 7 is a flowchart of an exemplary procedure of determining whether data encoding is tap-proof.

If the value of the tap-proof index F(k,d) is higher than a predetermined threshold, the encoding is considered to be sufficiently tap-proof. On the other hand, if the value of the tap-proof index F(k,d) is lower than a predetermined threshold, the encoding is considered to be vulnerable to tapping. FIG. 7 is a flowchart of an exemplary procedure for determining whether the encoding is tap-proof. First, the size of the set K, i.e., the value of p is determined (step S11). Then, the maximum number d by which the source node 2 is linked to the general node 1-*n* is counted (step S12). The tap-proof index is obtained by Equation (4) by using the values of p and d (step S13). It is then determined whether the tap-proof index is higher than a predetermined threshold (step S14). If the tap-proof index is higher than the predetermined threshold (YES at step S14), the encoding is considered to be sufficiently tap-proof (step S15). On the other hand, if the tap-proof index is lower than the predetermined threshold (NO at step S14), the encoding is considered to be vulnerable to tapping (step S16).

Thus, with this procedure it can be determined whether the encoding, i.e., the set K is tap-proof. A tap-proof coding (also known as wire-tap robust coding, i.e., WTRC) can be achieved by appropriately adjusting the size of the set K, e.g., in the source node 2 or the general node 1-*n*. The set K can be then notified to all the general nodes (in this case, the source node 2 and the general node 1-*n*) such that tap-proof coding can be performed at each general node. Alternatively, an external computing device can also be used to determine whether the encoding is tap-proof. When an external computing device is used, the size of the set K can be adjusted based on the determination of the external computing device and then used when encoding the data at each general node.

Sometimes it may not be possible to adjust the size of the set K due to some restrictions. In that case, other parameters in the communication system can be adjusted such that the security level of the transmitted data improves.

Meanwhile, Equation (4) is used under the assumption that all the data transmitted by each of the links L is tapped. However, Equation (4) can also be used in the following case.

Figure 8:
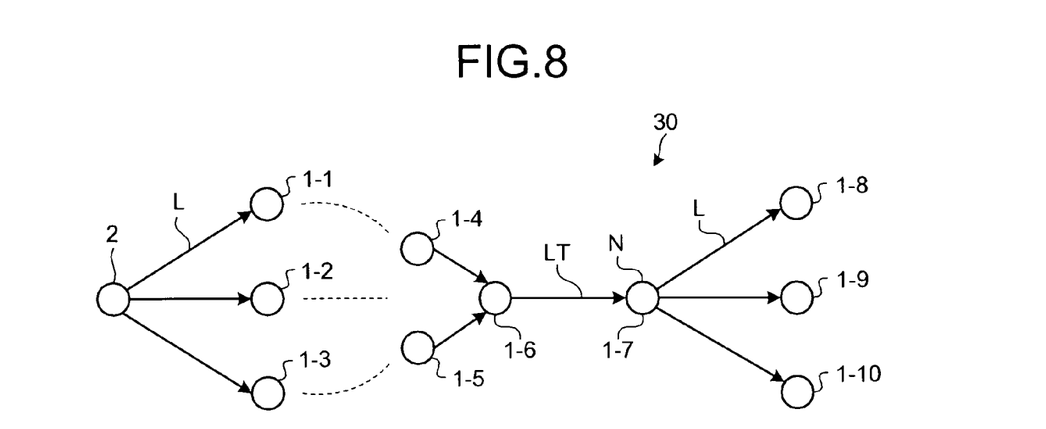
FIG. 8 is an exemplary schematic diagram of a communication system considered to be tapped by another tapping approach.

FIG. 8 is an exemplary schematic diagram of a communication system 30 in case a tapping approach other than the abovementioned tapping is adopted. The dotted lines shown in FIG. 8 indicate that the links between the corresponding general nodes are abbreviated for simplification.

In the communication system 30, the data in the form of a d-dimensional vector transmitted from the source node 2 is tapped along with the elements of the set K transmitted through a link LT. Moreover, it is also assumed that the relation between the d-dimensional vector and elements of the set K can be obtained by repetitive tapping for a number of times. To handle such a case, Equation (4) can be used to calculate the average number of times for which the repetitive tapping is required. In other words, Equation (4) can be used to protect the encoding not only when the matrices MS1 and MT are assumed to be tapped but also when the d-dimensional vector and the elements of the set K are assumed to be tapped.

As described above, data encoding is performed in each node of the communication systems 10, 20, 30. A source node in the communication system is linked to all general nodes by one or more independent paths. The number of independent paths by which the source node is linked to each of the general nodes is counted and the general node having the maximum number of inbound independent paths is determined. A tap-proof index is calculated based on the maximum number of independent paths and the size of a set of elements formed by data transmitted in the communication system. The security level against tapping of the data is determined based on whether the value of the tap-proof index is higher than a predetermined threshold. A tap-proof data can be transmitted by appropriately adjusting the size of the set of elements such that the value of the tap-proof index is higher than the predetermined threshold.

In the communication systems 10, 20, 30, the security level against tapping is evaluated based on the tap-proof index. However, depending on the values of the elements in the matrices used in the encoding, there is a possibility of original data being transmitted without encoding. Although adopting the encoding method makes it difficult to tap the entire data or the encoding parameters, it is undesirable that the original data gets transmitted. For example, it is dangerous to transmit a portion of a credit-card number without encrypting. To take care of this issue, another encoding method that prevents transmission of original data over a network is described below as a second embodiment according to the present invention. The structure of a communication system according to the second embodiment is identical to that according to the first embodiment.

Figure 9:
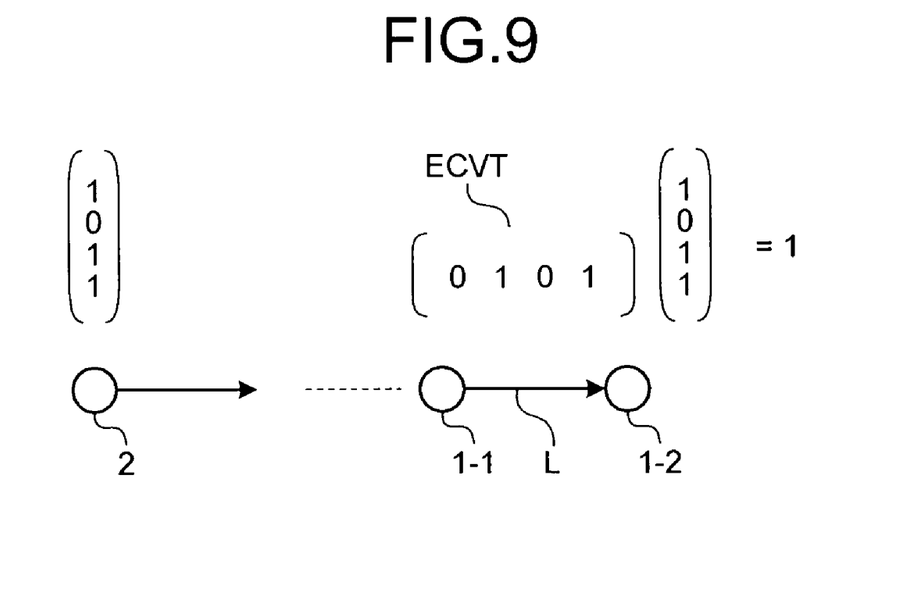
FIG. 9 is a diagram of an exemplary encoding vector.

In the encoding method according to the first embodiment, the data in the form of a d-dimensional vector is multiplied by the matrix MT. The matrix MT can be assumed to be formed by d-dimensional row vectors corresponding to each of the links L emerging from a particular node and the column vectors equal to the number of links L. In case of the source node 2, it can be assumed that for each of the links L transmitting the data (elements of the set K), a d-dimensional row vector is multiplied to the d-dimensional vector VS1, which is the data in the source node 2. A d-dimensional row vector under this assumption is referred to as an encoding vector ECVT. FIG. 9 is a diagram of an exemplary encoding vector ECVT when the maximum number of independent paths, i.e. the value of d is equal to four (d=4). According to the second embodiment, it is assumed that the encoding vector ECVT is separately determined for each of the links L. The object is to propose an appropriate way of determining the elements of the encoding vector ECVT such that transmission of raw data over the network is prevented.

Figure 10:
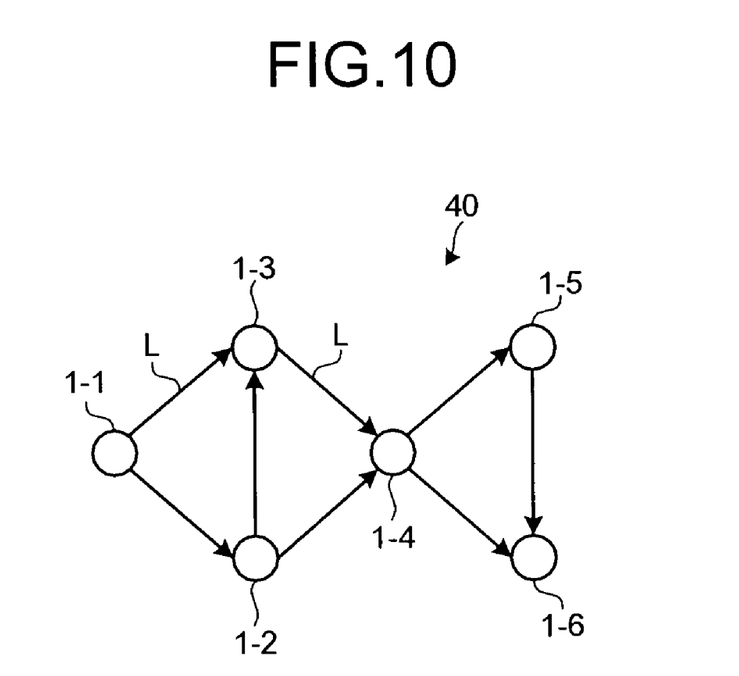
FIG. 10 is an exemplary schematic diagram of a communication system in which an encoding method according to a second embodiment of the present invention is implemented.

FIG. 10 is an exemplary schematic diagram of a communication system 40 in which the encoding method according to the second embodiment is implemented. The communication system 40 includes a plurality of nodes from 1-1 to 1-6. Each of the nodes 1-1 to 1-6 is linked by a link L having a communication direction from a node with a lower reference numeral towards a node with a higher reference numeral (in this case, the reference numeral 1-1 is lower than the reference numeral 1-2, the reference numeral 1-2 is lower than the reference numeral 1-3, and so on). Such a numbering is possible because, alike in the first embodiment, the communication system shown in FIG. 2 that includes a recursive communication path is out of the scope of the second embodiment. The encoding vector ECVT is determined in the order of the nodes with lower reference numerals.

The encoding vector ECVT corresponding to a link L emerging from, e.g., the general node 1-*n* (n is a natural number representing node number) is determined as given below. First, consider a liner combination V of, e.g., two encoding vectors ECVT. The linear combination V is a plane including the two encoding vectors ECVT. Reference may be had to "Linear network coding" (Vol. 49, No. 2, February 2003, pp. 371-381) by S-Y. R. Li et al., which is incorporated herein by reference and in which it is described that selecting a general vector from the linear combination V gives the best result.

According to the second embodiment, additional conditions are set while selecting the general vector to prevent the transmission of original data over the network. First, an ej-vector is determined in which only j-th component of d-th dimension has the value 1 and all other components have the value 0 (zero). The number of links L inbound to the general node 1-*n* is considered to be 't'. The subspace formed by the encoding vectors ECVT corresponding to the t number of links L is referred to as a subspace V. From among the encoding vectors ECVT corresponding to the links L emerging from the nodes with lower reference numerals than the general node 1-*n*, the encoding vectors ECVT less than the maximum number of independent paths are selected (i.e., the number of selected encoding vectors ECVT≦(d−1)). When the number of selected encoding vectors ECVT is not equal to (d−1), one ej-vector is selected. The subspace formed by the t number of the encoding vectors ECVT and the one ej-vector is referred to as a subspace W. If the subspace W includes the subspace V, the subspace W is not considered for further procedure. When the number of selected encoding vectors ECVT is equal to (d−1), the subspace formed only by the selected encoding vectors ECVT is referred to as a subspace W. In that case also, if the subspace W includes the subspace V, the subspace W is not considered for further procedure. Irrespective of the selected encoding vectors ECVT and the ej-vector, the elements of the subspace V, which is not included in the subspace W, are assigned to be the encoding vector of the links L emerging from the general node 1-*n*.

Figure 11A:
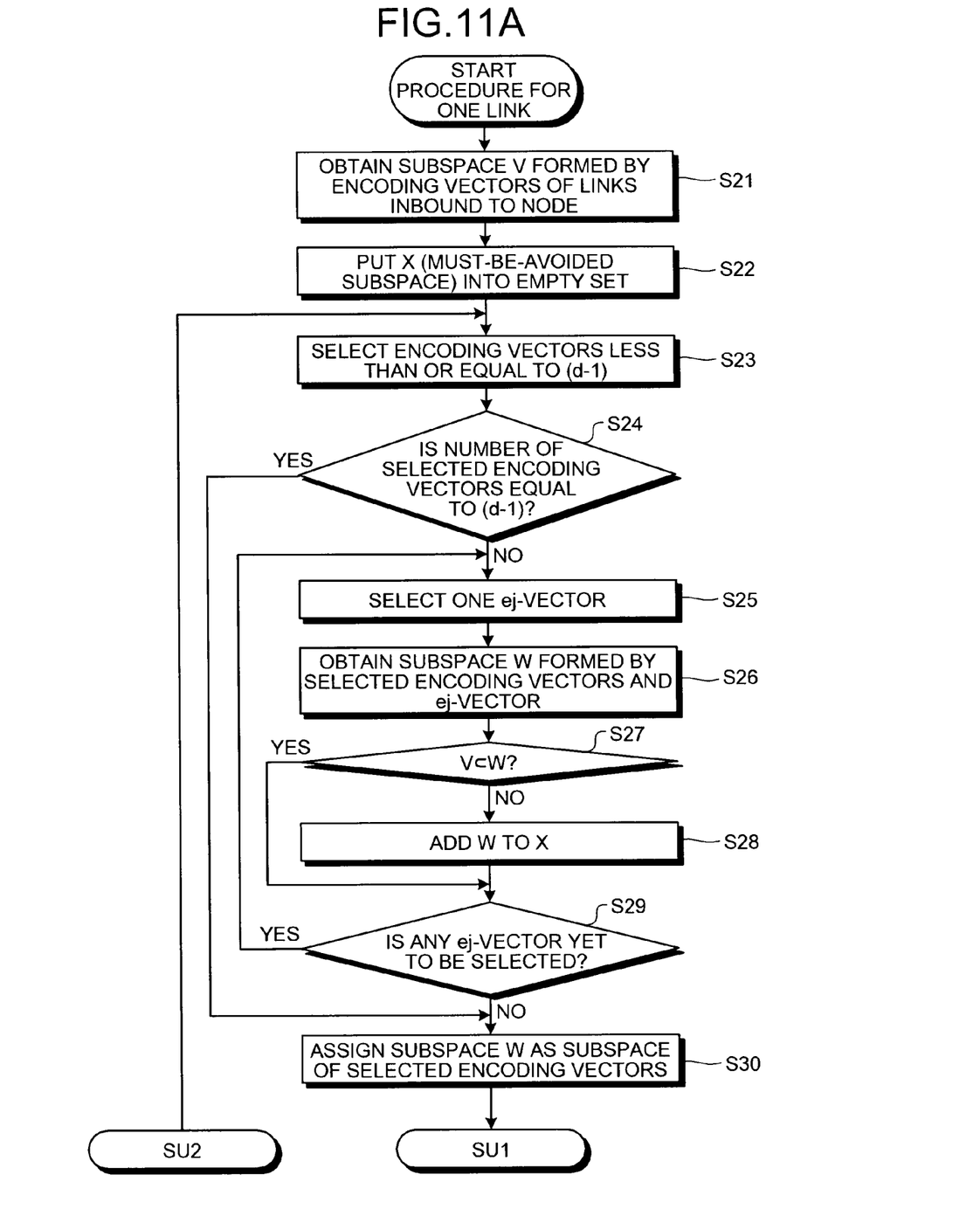
FIGS. 11A and 11B are flowcharts of an exemplary procedure of selecting encoding vectors corresponding to one of a plurality of links shown in FIG. 10.
Figure 11B:
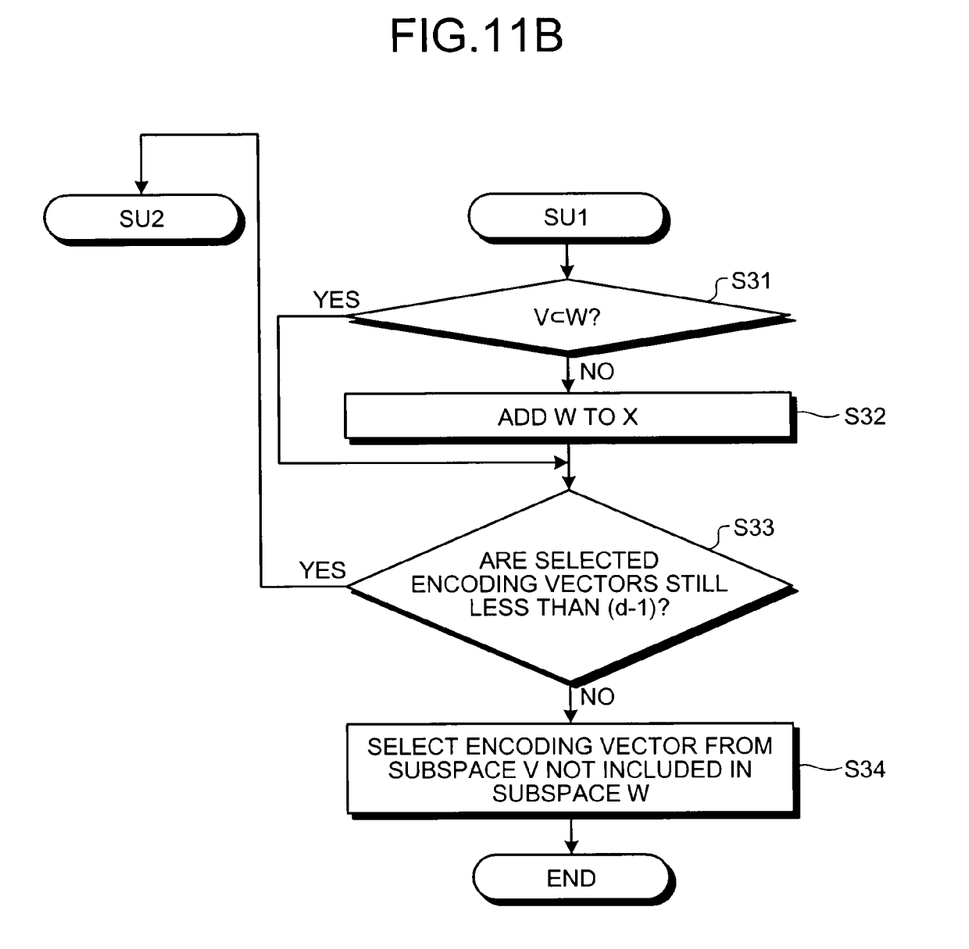

FIGS. 11A and 11B are flowcharts of an exemplary procedure of selecting the encoding vectors ECVT corresponding to one of the links L. First, the subspace V formed by the encoding vectors ECVT corresponding to the t number of links L inbound to the general node 1-*n* is obtained (step S21). A set X of must-be-avoided subspace from among the subspace V is then put into an empty set (step S22). From among the encoding vectors ECVT corresponding to links L emerging from the nodes with lower reference numerals than the general node 1-*n*, the encoding vectors ECVT less than (d−1) are selected (step S23). When the step S23 is repeated after returning from step S33 described below, the encoding vectors ECVT are selected from among the encoding vectors ECVT selected at the previous time at step S23.

It is then determined whether the number of selected encoding vectors ECVT is equal to (d−1) (step S24). If the number of selected encoding vectors ECVT is equal to (d−1) (YES at step S24), the system control proceeds to step S30. If the number of selected encoding vectors ECVT is not equal to (d−1) (NO at step S24), one ej-vector is selected (step S25). When the step S25 is repeated, the ej-vector is selected from among the ej-vectors not selected at the previous time at step S25.

The subspace W formed by the selected encoding vectors ECVT and the selected ej-vector is obtained (step S26). It is then determined whether the subspace W includes the subspace V (step S27). If the subspace W includes the subspace V (YES at step S27), the system control proceeds to step S29. If the subspace W does not include the subspace V (NO at step S27), the system control proceeds to step S28. The subspace W is added to the set X (step S28).

It is determined whether there is any ej-vector that has yet to be selected at step S25 (step S29). If there is a yet to be selected ej-vector (YES at step S29), the system control returns to step S25. If all the ej-vectors are selected (NO at step S29), the system control proceeds to step S30. The subspace W formed only by the selected encoding vectors ECVT at step S23 is obtained (step S30). It is then determined whether the subspace W includes the subspace V (step S31). If the subspace W includes the subspace V (YES at step S31), the system control proceeds to step S33. If the subspace W does not include the subspace V (NO at step S31), the subspace W is added to the set X (step S32).

It is then determined whether the selected encoding vectors ECVT are still less than (d−1) (step S33). If the selected encoding vectors ECVT are still less than (d−1) (YES at step S33), the system control returns to step S23. If no more encoding vectors ECVT can be selected (NO at step S33), an encoding vector ECVT is selected from the subspace V, which is not included in the subspace W in the set X, and assigned to be the encoding vector ECVT of the corresponding link L emerging from the general node 1-$n$ (step S34).

Figure 12:
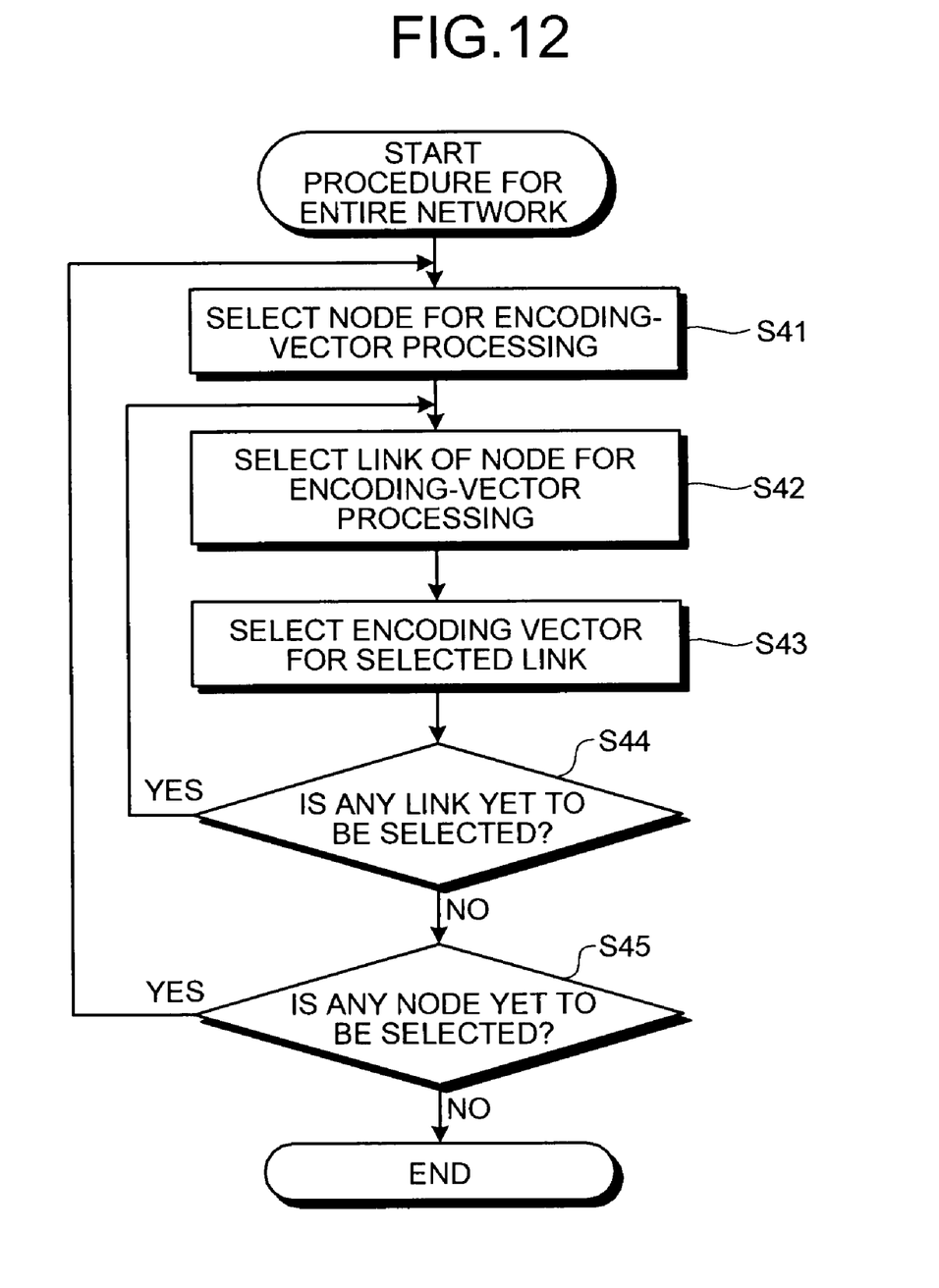
FIG. 12 is a flowchart of an exemplary procedure of selecting the encoding vectors corresponding to all the links of all nodes shown in FIG. 10.

The abovementioned procedure can be performed with respect to each of the links L emerging from the general node 1-$n$. FIG. 12 is a flowchart of a procedure of selecting the encoding vectors ECVT corresponding to all the links L of all the nodes (the source node 2 and the general nodes such as the general node 1-$n$) in the communication system 40. First, a node is selected from among the nodes on which encoding-vector processing is yet to be performed (step S41). From among the links L emerging from the selected node, one link L is selected on which encoding-vector processing is to be performed (step S42). The encoding vectors ECVT are selected corresponding to the selected link L by following the steps described in the abovementioned flowchart with reference to FIGS. 11$b$ and 11B (step S43). It is then determined whether all the links L emerging from the selected node are selected for encoding-vector processing (step S44). If all the links L are not yet selected for encoding-vector processing (NO at step S44), the procedure returns to step S42. If all the links L are already selected for encoding-vector processing (YES at step S44), it is determined whether there is any node on which encoding-vector processing is yet to be performed (step S45).

If there is a node on which encoding-vector processing is yet to be performed (YES at step S45), the system control returns to step S42. If encoding-vector processing is already performed on all the nodes (NO at step S46), the procedure ends.

As described above, encoding vectors are determined for each of the links emerging from each of the nodes. Alternatively, encoding vectors can be determined for each of the links emerging from a particular node and then notified to the other nodes. Moreover, an external computing device can also be used to determine the encoding vectors and set as the encoding vectors for each of the nodes.

If the subspace W includes the subspace V, the subspace W is not considered for further operations. Thus, the encoding vector ECVT is selected from the subspace V not included in the subspace W. As a result, in addition to the advantages according to the first embodiment, un-encoded raw data is prevented from being transmitted over the network thereby improving the data confidentiality and data security.

According to one aspect of the present invention, data encoding is performed in each node of a communication system. A source node in the communication system is linked to all general nodes by one or more independent paths. The number of independent paths by which the source node is linked to each of the general nodes is counted and the general node having the maximum number of inbound independent paths is determined. A tap-proof index indicating security level against tapping of data is calculated based on the maximum number of independent paths and the size of a set of elements formed by the data transmitted in the communication system. The tap-proof index is set to be higher than a predetermined threshold thereby improving the security level of data transmission in the communication system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of transmitting data in a communication system, the communication system including a source node that generates the data and a plurality of general nodes, each being a destination node for the data or a relay node for relaying the data, the source node being linked with each of the general nodes by at least one independent path, the data being encoded by using an encoding matrix at the source node and the relay node, the method comprising:
    determining a general node from among the general nodes that has maximum number of independent paths up to the source node, the maximum number of independent paths being a largest number of independent paths which exist for any of the general nodes;
    setting a size of a set formed by elements of the encoding matrix;
    calculating a tap-proof index that indicates security level against tapping of the data flowing in the communication system based on the maximum number of independent paths and the size of the set; and
    controlling the tap-proof index.

2. The method according to claim 1, wherein the controlling includes determining whether the tap-proof index is higher than a threshold, and when the tap-proof index is lower than the threshold, resetting the size of the set such that the tap-proof index becomes higher than the threshold.

3. A method of transmitting data in a communication system, the communication system including a source node that generates the data and a plurality of general nodes, each being a destination node for the data or a relay node for relaying the data, the source node being linked with each of the general nodes by at least one independent path, the independent path including at least one communication link, the data being encoded at the source node and the relay node, the method comprising:
    determining a general node from among the general nodes that has maximum number of independent paths up to the source node, the maximum number of independent paths being a largest number of independent paths which exist for any of the general nodes;
    calculating an encoding vector corresponding to each of the communication links;

encoding data passing through a communication link by multiplying an encoding vector corresponding to the communication link to the data passing through the communication;

obtaining a subspace of each of the encoding vectors;

selecting encoding vectors of less than or equal to a second maximum number of independent paths from among the encoding vectors, the second maximum number of independent paths being one less than the maximum number of independent paths;

first-calculating, when number of the encoding vectors selected at the selecting is less than the second maximum number of independent paths, a vector subspace that is formed by the encoding vectors selected at the selecting and a vector, the vector belonging to a group of vectors that have number of dimensions equal to the maximum number of independent paths with only one of components being 1 and all other components being 0;

second-calculating, when the number of the encoding vectors selected at the selecting is equal to the second maximum number of independent paths, a vector subspace formed by only the encoding vectors selected at the selecting;

deselecting the vector subspace calculated at any one of the first-calculating and the second-calculating when the vector subspace includes the subspace obtained at the obtaining;

repeating the selecting, the first-calculating, the second-calculating, and the deselecting if there is a vector in the group yet to be processed at the first-calculating and an encoding vector yet to be selected at the selecting; and assigning an encoding vector, the vector subspace of which is not deselected at the deselecting, to the communication link.

4. A communication system including a source node that generates data and a plurality of general nodes, each being a destination node for the data or a relay node for relaying the data, the source node being linked with each of the general nodes by at least one independent path, the data being encoded by using an encoding matrix at the source node and the relay node, any one node from among the source node and the general nodes comprising:

a determining unit that determines a general node from among the general nodes that has maximum number of independent paths up to the source node, the maximum number of independent paths being a largest number of independent paths which exist for any of the general nodes;

a setting unit that sets a size of a set formed by elements of the encoding matrix;

a calculating unit that calculates a tap-proof index that indicates security level against tapping of the data flowing in the communication system based on the maximum number of independent paths and the size of the set; and a controlling unit that controls the tap-proof index.

5. The communication system according to claim 4, wherein the controlling unit determines whether the tap-proof index is higher than a threshold, and when the tap-proof index is lower than the threshold, resets the size of the set such that the tap-proof index becomes higher than the threshold.

6. A communication system including a source node that generates data and a plurality of general nodes, each being a destination node for the data or a relay node for relaying the data, the source node being linked with each of the general nodes by at least one independent path, the independent path including at least one communication link, the data being encoded at the source node and the relay node, any one node from among the source node and the general nodes comprising:

a determining unit that determines a general node from among the general nodes that has maximum number of independent paths up to the source node, the maximum number of independent paths being a largest number of independent paths which exist for any of the general nodes;

an encoding-vector calculating unit that calculates an encoding vector corresponding to each of the communication links;

an encoding unit that encodes data passing through a communication link by multiplying an encoding vector corresponding to the communication link to the data passing through the communication;

a subspace calculating unit that calculates a subspace of each of the encoding vectors;

a selecting unit that selects encoding vectors of less than or equal to a second maximum number of independent paths from among the encoding vectors, the second maximum number of independent paths being one less than the maximum number of independent paths;

a first selected-subspace calculating unit that calculates, when number of the encoding vectors selected by the selecting unit is less than the second maximum number of independent paths, a vector subspace that is formed by the encoding vectors selected by the selecting unit and a vector, the vector belonging to a group of vectors that have number of dimensions equal to the maximum number of independent paths with only one of components being 1 and all other components being 0;

a second selected-subspace calculating unit that calculates, when the number of the encoding vectors selected by the selecting unit is equal to the second maximum number of independent paths, a vector subspace formed by only the encoding vectors selected by the selecting unit;

a deselecting unit that deselects the vector subspace calculated by any one of the first selected-subspace calculating unit and the second selected-subspace calculating unit when the vector subspace includes the subspace calculated by the subspace calculating unit, wherein the selecting unit, the first selected-subspace calculating unit, the second selected-subspace calculating unit, and the deselecting unit repeat their operations if there is a vector in the group yet to be processed by the first selected-subspace calculating unit and an encoding vector yet to be selected by the selecting unit; and an assigning unit that assigns an encoding vector, the vector subspace of which is not deselected by the deselecting unit, to the communication link.

* * * * *